Jan. 15, 1957 J. CHARLTON 2,777,951

FREQUENCY MODULATING SYSTEMS FOR PHASE-SHIFT OSCILLATORS

Filed Dec. 10, 1952

INVENTOR
JOHN CHARLTON
BY
Thomas M. Ferrill, Jr.
ATTORNEY

Patented Jan. 15, 1957

1

2,777,951

FREQUENCY MODULATING SYSTEMS FOR PHASE-SHIFT OSCILLATORS

John Charlton, Levittown, N. Y., assignor to Sperry Rand Corporation, a corporation of Delaware Application December 10, 1952, Serial No. 325,105

14 Claims. (Cl. 250—36)

The present invention relates to systems for modulating or varying the frequency of phase-shift oscillators.

A phase-shift oscillator normally comprises a single amplifier tube and an anode to grid feedback circuit which includes frequency sensitive phase-shift means therein. Usually such means comprise a network which includes combinations of impedances such as resistors and capacitors (an R–C network), resistors and inductors (an R–L network), or inductors and capacitors (an L–C network), and is adapted to produce approximately a 180 degree phase shift or odd multiple thereof at the frequency of oscillations desired. The gain of the amplifier tube is adjusted to overcome circuit losses, and oscillations will be produced when the signal voltage fed back to the grid is out of phase with the voltage at the anode by 180 degrees.

Systems for modulating the frequency of phase-shift oscillators are known in the prior art. Some of these employ a reactance control tube for introducing a simulated reactance across the oscillator phase-shift network, the aforementioned reactance being variable in accordance with a modulating voltage applied to the grid of the reactance control tube. In such systems the variable dynamic plate resistance of the control tube also inherently appears in the phase-shift network.

Another type frequency modulating system employs a variable resistance control tube. Where resistors are employed as part of the phase-shift network and constitute frequency determining elements of the oscillator the variable dynamic plate resistance of the control tube is utilized as part of the resistance of the phase-shift network. Applying a modulating voltage to the grid of the control tube causes a variation in the dynamic plate resistance of the tube and therefore the oscillator frequency.

Phase-shift oscillators which are frequency modulated by systems of the aforementioned type are not able to maintain very good mean frequency stability. Because a control tube dynamic plate resistance or the dynamic plate resistance and a reactance produced by such a tube are inserted into the oscillator phase-shift network, variations in control tube dynamic plate resistance and mutual conductance with changes in tube age, ambient temperature, supply voltages etc. become critical and cause undesired changes in the oscillator mean frequency. This is especially true in oscillators having resistance elements in the phase-shift network. Although stability in regard to the aforementioned variations may be improved by reducing the effect of the control tube resistance inserted into the network, greater deviations in the modulating signal would then ordinarily be required to vary the oscillator over a predetermined wide range of frequencies. In such a case the linearity of a graphical plot of oscillator frequency versus the modulating input voltage would be lost over part of said range because it would be necessary to operate the control tube on non-linear portions of the characteristic curve therefor.

It is an object of this invention to provide a modulating circuit in combination with a phase-shift oscillator wherein the mean oscillator frequency remains extremely stable regardless of the presence of the modulating circuit.

2

It is a further object of the present invention to improve the mean frequency stability of a phase-shift oscillator which includes a frequency modulating circuit while retaining good linearity of oscillator frequency versus modulating voltage over a relatively wide band of frequencies.

Another object of the present invention is to provide a phase-shift oscillator having the aforementioned attributes and wherein amplitude modulation is eliminated or minimized during frequency modulation.

The foregoing objects are attained by introducing a variable control voltage at oscillator frequency into the oscillator feedback circuit. Means are employed to insure that the aforementioned control voltage is out of phase by an amount different from 180 degrees with the transmission voltage in the particular place in the feedback circuit in which the control voltage is inserted. The control voltage combines with the aforesaid transmission voltage so that the resultant voltage represents a vector sum of the two voltage components, and the mean oscillator frequency is partially determined by the phase of said resultant voltage. The oscillator may be frequency modulated by varying the magnitude or phase of the control voltage. Frequency modulation occurs because of the tendency of the aforementioned resultant voltage to change its phase at the aforementioned mean frequency with variations in magnitude or phase of the control voltage component. The frequency must change because a phase shift of 180 degrees or odd integral multiple thereof must be produced in the feedback circuit for oscillations to be sustained.

Other objects and advantages of this invention will become apparent from the following specification, taken in connection with the accompanying drawings in which.

Figures 1, 3:
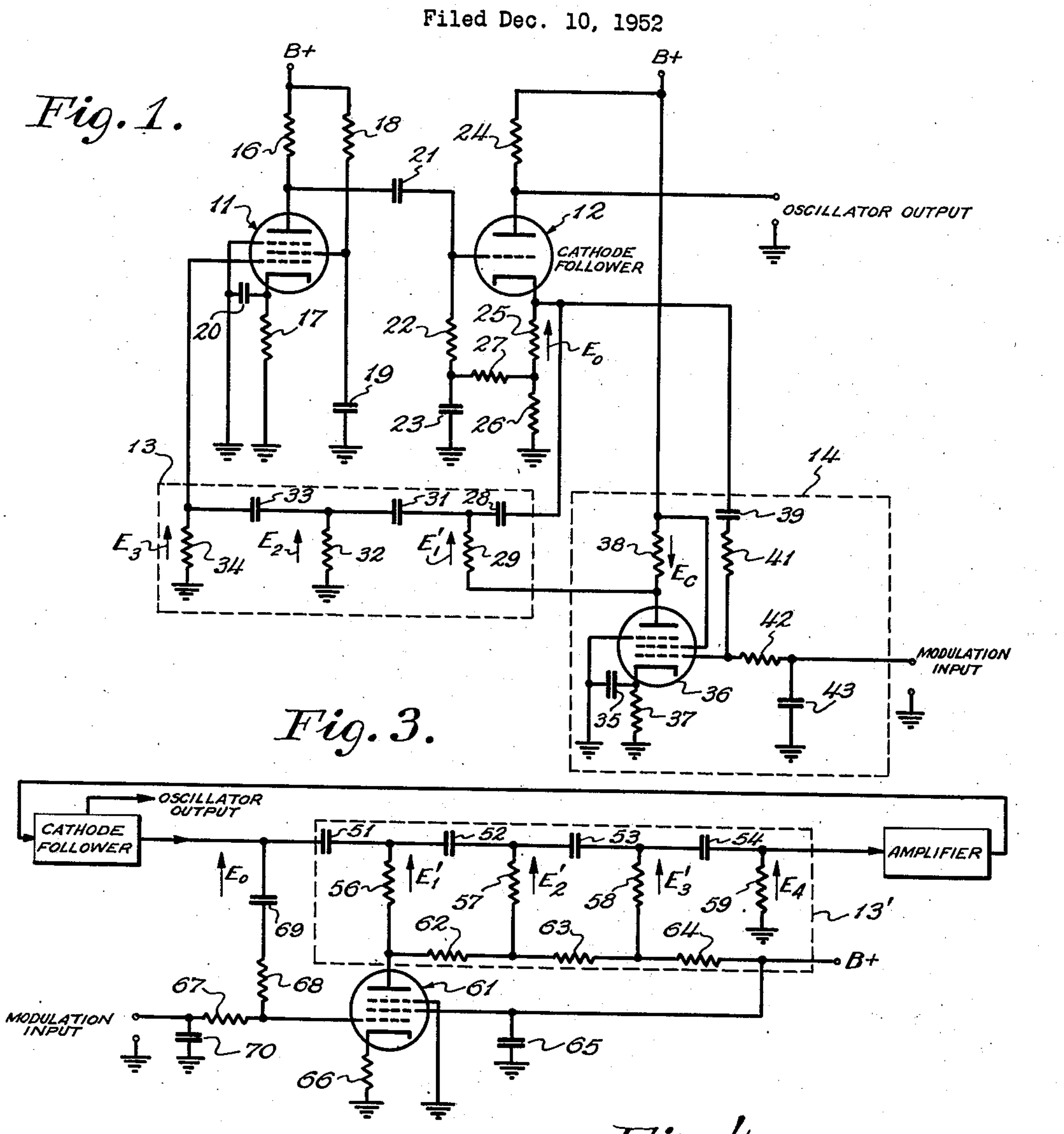
Fig. 1 is a schematic diagram of a phase-shift oscillator of the R–C type which embodies a frequency modulating circuit in accordance with a first embodiment of the invention.
Figure 4:
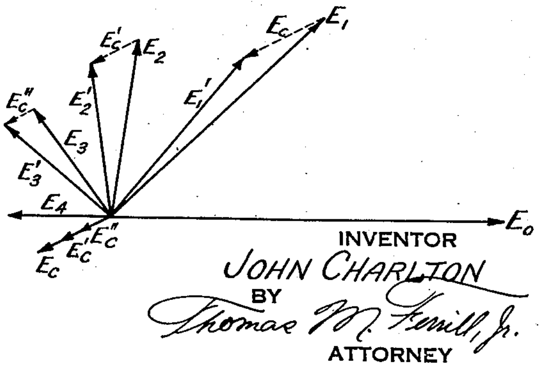

Fig. 3 is a schematic diagram of a phase-shift oscillator of the R–C type which embodies a second frequency control circuit of the present invention wherein variable control voltages are inserted into a plurality of branches of the phase-shift network; and Fig. 4 is a vector diagram illustrating component and resultant voltages at oscillator frequency in different branches of the phase-shift network in Fig. 3.

Referring to Fig. 1, a variable frequency phase-shift oscillator is shown comprising an audio amplifier tube 11, a cathode follower tube 12, a frequency sensitive phase-shift network 13, and a frequency modulating circuit 14.

The amplifier tube 11 comprises a pentode which has an anode resistor 16, cathode bias resistor 17, and screen grid dropping resistor 18. The anode resistor 16 and the dropping resistor 18 are connected to a B+ source of supply voltage in the manner shown. The suppressor grid of pentode 11 is connected directly to ground and the screen grid is bypassed to ground at oscillator frequencies by a capacitor 19. The cathode bias resistor 17 may be bypassed by capacitor 20, or it may be left un-bypassed if desired. If un-bypassed, the resulting negative feedback will tend to reduce harmonic and phase distortion and stabilize the gain of tube 11 in a manner known in the art.

The alternating voltage output from tube 11 is applied to the grid of a triode tube 12 by means of a conventional resistance-capacitance network comprising output coupling capacitor 21 and a resistor 22. Capacitor 23 is connected to resistor 22 and provides a low impedance path to ground for alternating currents at oscillator frequency. A load resistor 24 is connected to the anode of tube 12 so that an oscillator output voltage may be derived therefrom. Tube 12 is employed as an output tube and also as a cathode follower.

The cathode of tube 12 is connected to ground through cathode resistors 25 and 26. A resistor 27, much larger in value than resistor 26, is connected between the junction point of resistors 25 and 26 and the junction point of resistor 22 and capacitor 23. If resistor 25 is low in value, the negative grid bias is low, and the output voltage at oscillator frequency at the cathode of tube 12 will be relatively high and substantially distortionless. Also an optimum effective alternating current output impedance at the cathode of tube 12 will be maintained.

The alternating voltage output at the cathode of tube 12 is supplied to the input terminals of phase-shift network 13. Network 13 is composed of three resistance-capacitance phase-shift meshes connected in tandem. The first mesh comprises capacitor 28 and resistor 29, capacitor 28 being connected to the cathode of tube 12. The second mesh comprises capacitor 31 and resistor 32. The third mesh comprises capacitor 33 and resistor 34, and is connected to the input grid of the amplifier tube 11. Phase-shift network 13 may be of the type wherein the impedance of each succeeding mesh is appreciably higher than that of the preceding mesh, so that the loading on any particular mesh resulting from the following mesh or meshes is low. Such a network reduces the transmission attenuation therethrough and lowers the amount of gain required of tube 11 in a manner well-known in the art. Impedance tapering of the network 13 increases the oscillator stability because it tends to isolate the phase-shift meshes from each other and permits more negative feedback to be used in the cathode circuit of tube 11 if desired.

As was mentioned before, the oscillator output is obtained from the anode circuit of cathode follower 12, therefore isolating the oscillator load from the oscillator feedback loop. Connecting the input of the phase-shift network 13 to the cathode of tube 12 provides a low driving source impedance for the phase-shift network 13. A low source impedance increases stability by reducing the effect of the driving impedance on the phase shift through network 13.

The phase-shift oscillator of Fig. 1 can be frequency modulated in accordance with the present invention by utilizing a control circuit 14. Circuit 14 includes a control tube 36, which is preferably a high transconductance variable-mu pentode having a cathode resistor 37 and an anode or plate load resistor 38. Resistor 38 has a very low value of resistance compared to the dynamic plate resistance of pentode 36 so that variations in the pentode dynamic plate resistance will produce no effective change in the resistance characteristics of the phase-shift network 13. This is apparent since in the equivalent circuit of the system, resistor 38 and the dynamic plate resistance of tube 36 are in parallel between ground and the lower terminal of resistor 29 of the first mesh of network 13. Since resistor 38 comprises a portion of the resistive branch of the first mesh of the phase-shift network 13, it should also be low in value compared to resistor 29 to reduce the tendency of resistor 38 to affect the transmission phase shift through the phase-shift network, and to provide a low impedance source for injecting the control voltage into network 13.

The resistor 29 together with the parallel combination of resistor 38 and tube 36 comprise shunt impedance means for the first mesh of phase-shift network 13. Capacitor 28 comprises series impedance means for said first mesh. The resistor 38 also comprises load means for the tube 36, and is connected between ground for oscillator voltages and a point in the first phase shift mesh at the lower terminal of resistor 29. Resistor 29 comprises a substantial impedance portion of the shunt impedance means comprising resistor 29 together with the parallel combination of resistor 38 and tube 36 so the lower terminal of resistor 29 is near ground potential for oscillator voltages.

The suppressor grid of tube 36 is connected directly to ground and the screen grid thereof is connected to a B+ source of potential. The cathode resistor 37 may be bypassed to ground by capacitor 35, or it may be left un-bypassed to permit negative feedback to the tube 36 and stabilization of the gain of the tube. A large amount of feedback is feasible because the voltage gain required from tube 36 is normally less than unity.

Although the control grid of tube 36 may be coupled to other points in the oscillator circuit, for instance to the anode of tube 11 or some other point in the phase-shift network 13, it is preferably coupled to the input to network 13 at the cathode of tube 12 as shown. This coupling is utilized because the cathode impedance of tube 12 represents a low impedance source for tube 36, therefore reducing the effect of source impedance variations on the voltage applied to the grid of tube 36. Furthermore, the voltage at the cathode of tube 12 is large enough to permit tube 36 to have a low gain and maximum stability of operation, and permits an attenuation and phase-shift network comprising capacitor 39, resistors 41 and 42, and capacitor 43 to be utilized as part of the coupling means between the grid of tube 36 and the cathode of tube 12. Such a network is employed to provide maximum isolation between the modulating input terminals shown and the input of phase-shift network 13, and to provide a means for controlling the phase of the oscillator voltage applied to the grid of tube 36.

The control grid of tube 36 is coupled to the modulating input terminals shown so that a direct current or low frequency (compared to the oscillator frequency) modulating input signal may be applied to the grid of tube 36 through resistor 42. Capacitor 43 bypasses the modulating input terminals to ground to keep high frequency currents therefrom.

Figure 2:
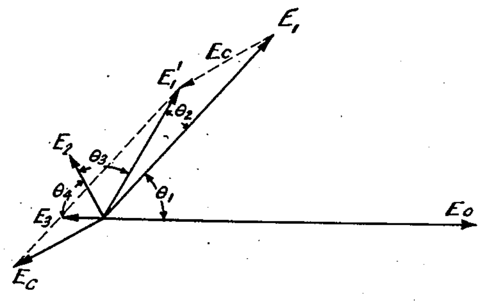
Fig. 2 is a vector diagram illustrating component and resultant voltages at oscillator frequency in different branches of the phase-shift network in Fig. 1.

To understand the operation of the circuit shown in Fig. 1, reference should also be made to Fig. 2. Fig. 2 is a vector diagram which illustrates the relationship of various component and resultant alternating voltages at an oscillator frequency $F_o$ in different branches of the phase-shift network 13. Fig. 2 represents a condition when no modulation input voltage is applied to grid of tube 36. Vector $E_o$ is a voltage at the mean oscillator frequency $F_o$, the voltage occurring at the cathode of tube 12 in Fig. 1. Vector $E_1$ represents the voltage component across the resistive branch 29 of the first mesh of the phase-shift network 13, due to the coupling impedance 28. Vector $E_1$ is shifted in phase from $E_o$ by an angle $\theta_1$ because of the transmission phase shift of voltage through the first mesh 28, 29 of network 13. Vector $E_c$ is the alternating voltage at the anode of tube 36, and is shifted in phase from $E_o$ by an amount determined by the phase shift through the network comprising capacitors 39 and 43 and resistors 41 and 42 plus the conventional 180 degree polarity inversion of signal voltage through amplifier 36. Vector $E_1'$ is the resultant voltage from a combination of $E_1$ and $E_c$, and is shifted in phase from $E_1$ by an angle $\theta_2$. Vector $E_1'$ therefore represents the net output from the aforementioned first mesh, and is the resultant input voltage for the second mesh 31, 32 of the phase-shift network 13. Vector $E_2$ is the output from the second mesh 31, 32 and is shifted in phase $E_1'$ by an angle $\theta_3$. Vector $E_3$ is the output from the third mesh 33, 34, and is shifted in phase from $E_3$ by an angle $\theta_4$. Voltage $E_3$ is applied to the grid of amplifier 11. Since amplifier 11 produces its amplified output voltage at 180° phase displacement with respect to its input voltage, the system of Fig. 1 will oscillate at that frequency at which the output of network 13 is opposite in phase to the input thereof. It is at the frequency $F_o$ at which this condition is realized, since at this frequency, $\theta_1+\theta_2+\theta_3+\theta_4=180°$, the value of $\theta_2$ being the phase displacement which results with the normal unmodulated output of control tube 36.

If a modulation input voltage is applied to the grid of the variable-mu tube 36 the gain or voltage amplification produced by control tube 36 will vary. This changes the magnitude of vector voltage $E_c$, thereby tending to change the phase angle $\theta_2$ between vectors $E_1'$ and $E_1$. Since this is equivalent to varying the phase shift in the first mesh of the network 13 at the frequency $F_o$ the oscillator frequency will automatically change to retain a total 180 degree phase shift through the network 13. The resultant deviation from the mean oscillator frequency $F_o$ will therefore vary with the modulation input voltage.

If the modulation input voltage applied to tube 36 drives the grid thereof in a positive direction, the gain of tube 36 increases, and the length of vector $E_c$ is increased. An increase in vector $E_c$ produces an increase in the phase angle $\theta_2$ between $E_1'$ and $E_1$, and tends to reduce the amplitude of $E_1'$ relative to vector $E_1$. An increase in the angle $\theta_2$ tends to raise the total phase shift through network 13 with respect to the mean frequency $F_o$. Therefore, the oscillator frequency immediately rises to reduce the sum of the mesh phase shifts, $\theta_1+\theta_3+\theta_4$, by an amount equal to the increase of $\theta_2$, thereby retaining 180 degrees between $E_o$ and $E_3$. Note that the phase shift produced by each of the phase-shift meshes is less at higher frequencies, and likewise, the voltage reduction per mesh is lower. Obviously, the inverse of the above is true if the modulation input voltage drives the grid in a negative direction to lower the frequency.

When the oscillator frequency is increased there is less attenuation through the phase-shift meshes, i. e.

$$\frac{E_1}{E_o}\times\frac{E_2}{E_1'}\times\frac{E_3}{E_2}$$

is increased. This increase tends to be compensated for by the decrease in the ratio of $$\frac{E_1'}{E_1}$$

brought about by the increase in vector $E_c$. When vector $E_c$ is reduced by driving the grid of tube 36 more negative, the vector $E_1'$ tends to increase in magnitude and shift in phase to lower the oscillator frequency. At lower frequencies the attenuation through the phase-shift meshes increases, but the increase in the ratio of $$\frac{E_1'}{E_1}$$

tends to compensate for the increased attenuation. Therefore, vector $E_3$ tends to remain substantially constant in length throughout the range of frequency modulation, and thus amplitude modulation during frequency modulation is minimized.

Some control over the extent of amplitude modulation exists in the selection of the phase of $E_c$, which can be effected by changing the relative values of capacitors 39, 43 and resistors 41, 42.

The circuit of Fig. 3 illustrates a slightly different form of the present invention which may be utilized to provide an even greater degree of control over any amplitude modulation which might occur.

In Fig. 3 the input terminals to the phase-shift network 13' may be connected to the cathode of a cathode follower and the output terminals of the phase-shift network 13' are connected to the input terminals of an amplifier circuit as in Fig. 1.

The phase-shift network 13' in Fig. 3 comprises, for example, four meshes. These include capacitors 51, 52, 53 and 54 and resistors 56, 57, 58 and 59. A control tube 61, which may be a variable-mu pentode, is employed to frequency modulate the oscillator circuit by inserting a control voltage into the first three of the four resistive branches of the phase-shift network 13'.

The anode of the control tube 61 is connected to a B+ source of supply voltage through small load resistors 62, 63 and 64. The impedance of these resistors must be kept low for the reasons mentioned in the description of anode resistor 38 in Fig. 1. The screen grid of tube 61 is connected directly to the B+ source, and is bypassed to ground by capacitor 65. The suppressor grid is connected directly to ground. The cathode of tube 61 is connected to ground through a resistor 66, which is un-bypassed to provide stabilizing negative feedback to tube 61 in a manner described before.

Resistor 56 in the first mesh of the phase-shift network 13' is connected to the junction of load resistor 62 and the anode of tube 61. The second mesh resistor 57 is connected to the junction of anode load resistors 62 and 63, and the third mesh resistor 58 is connected to the junction of anode load resistors 63 and 64.

The grid of tube 61 is coupled to the cathode of the cathode follower tube by means of a phase-shifting and attenuating network comprising resistors 67 and 68, and capacitors 69 and 70. A modulation input is applied to the grid of tube 61 in the manner described with respect to Fig. 1. Capacitor 70 is large in value to provide a low impedance path at oscillator frequencies, and thus prevents high frequency currents from reaching the modulating input terminals.

To understand the operation of the circuit shown in Fig. 3 reference should also be made to Fig. 4. If no modulation input signal is being received the oscillator will produce oscillations at a mean frequency $F_o$ whereat a transmission phase shift of approximately 180 degrees occurs in the phase-shift network shown in Fig. 3. Under such conditions a voltage $E_o$ at oscillator frequency $F_o$ appears across the input terminals to the phase-shift network 13'. The voltage $E_o$ is shifted in phase through the first mesh of the phase-shift network and appears as a component $E_1$ across the resistance of the first mesh 51, 56. A version of $E_o$ is also applied to the grid of tube 61, being attenuated and shifted in phase with respect to $E_o$ by the network comprising resistors 67 and 68 and capacitors 69 and 70.

The vector $E_c$ produced at the anode of tube 61 vectorially combines with the component $E_1$ in the first mesh 51, 56 of the phase-shift network 13' as is shown in Fig. 4. The resultant output of the first mesh is indicated by $E_1'$. Vector $E_1'$ is applied to the second mesh 52, 57 of the phase-shift network 13' and the transmission phase shift therethrough produces a vector component $E_2$ at the output thereof. However, a reduced version of $E_c$ appears across resistors 63 and 64, indicated by $E_c'$, which combines in the second mesh with $E_2$ to produce $E_2'$. The voltage $E_2'$ is applied to the third mesh 53, 58 of the phase-shift network and a component $E_3$ appears across the output thereof as a result of the transmission phase shift therethrough. A reduced version of $E_c$, indicated by the voltage drop $E_c''$ across resistor 64, is vectorially combined with $E_3$ in the third mesh to produce an output $E_3'$. Voltage $E_3'$ is applied to the fourth mesh 54, 59 of the phase-shift network, and is shifted to $E_4$ by an amount determined by the phase shift produced by capacitor 54 and resistor 59. Since the voltage output $E_4$ is 180 degrees out of phase with the oscillator voltage $E_o$, oscillation will be sustained at the mean frequency $F_o$.

Changing the bias on the grid of tube 56 and the gain thereof will change the frequency in the same manner described with respect to Fig. 1. If the bias change is such as to provide an increase in frequency, the product of the ratios of $$\frac{E_1}{E_o}\times\frac{E_2}{E_1'}\times\frac{E_3}{E_2'}\times\frac{E_4}{E_3'}$$

of the vectors shown in Fig. 4 will increase. Since three control voltages represented by vectors $E_c$, $E_c'$ and $E_c''$ are inserted into different places in the phase shift network 13′, the product of $$\frac{E_1'}{E_1}\times\frac{E_2'}{E_2}\times\frac{E_3'}{E_3}$$

can readily be decreased by the proper amount to be equal or approximately equal to the increase of the product $$\frac{E_i}{E_o}\times\frac{E_2}{E_1'}\times\frac{E_3}{E_2'}\times\frac{E_4}{E_3'}$$

The inverse is true with reductions in frequency; increases in attenuation due to lower frequencies being substantially compensated by the present system. Therefore, there will be substantially no amplitude modulation with frequency modulation in the present system.

An oscillator for operation at 40 kilocycles which has been constructed in accordance with the invention shown in Fig. 1 employs a high transconductance sub-miniature type amplifier tube 11 and control tube 36, both having electrical characteristics essentially the same as those of pentode type 6AK5. Typical values for various circuit elements employed in such an oscillator are as follows:

*Resistors*

| | Ohms |
|---|---|
| R16 | 36,000 |
| R17 | 330 |
| R18 | 120,000 |
| R22 | 470,000 |
| R24 | 10,000 |
| R25 | 470 |
| R26 | 4,700 |
| R27 | 750,000 |
| R29 | 16,000 |
| R32 | 47,000 |
| R34 | 140,000 |
| R37 | 11,000 |
| R38 | 1,300 |
| R41 | 39,000 |
| R42 | 62,000 |

*Capacitors*

| | | |
|---|---|---|
| C19 | microfarads | .01 |
| C20 | do | .01 |
| C21 | do | .01 |
| C23 | do | .01 |
| C28 | micro-microfarads | 91 |
| C31 | do | 47 |
| C33 | do | 24 |
| C35 | microfarads | .01 |
| C39 | micro-microfarads | 24 |
| C43 | do | 470 |

A 40-kilocycle oscillator of the aforementioned type may be frequently modulated in a substantially linear manner as a function of modulating input voltages over a wide band of frequencies. A graph of modulation input voltages required to vary the oscillator frequency from 34 to 46 kilocycles (a bandwidth of 30 percent of the mean oscillator frequency of 40 kilocycles), versus the corresponding oscillator frequencies produced by said voltages, will result in an almost perfectly linear plot. Furthermore it has been found that the mean frequency of an oscillator constructed in accordance with the present invention remains extremely stable during the life thereof. Variations in the characteristics of the control tube or other tubes in the oscillator circuit with life, ambient temperature changes, supply voltage, etc. have only a small effect, if any, on the oscillator mean frequency.

Although an oscillator phase-shift network has been shown and described in the form of one particular type resistance-capacitance circuit, it is apparent that other type R–C phase-shift circuits could equally well be employed. Likewise R–L or L–C phase-shift circuits, which have heretofore been employed in phase-shift oscillator designs, could be utilized without going beyond the scope of the present invention. Although various oscillator elements have been shown and described and values for circuit components of a typical oscillator given, it is understood that such elements and values are merely illustrative and not to be taken in a limiting manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense..

What is claimed is:

1. A variable frequency phase-shift oscillator, comprising an amplifier having input and output terminals and a regenerative feedback circuit coupled therebetween, said feedback circuit including a plurality of frequency sensitive phase-shift sections including series and shunt impedance means therein, and a frequency control circuit coupled to said feedback circuit, said frequency control circuit comprising means for receiving a first alternating voltage version from a first point in said feedback circuit, and supplying a second alternating voltage version to at least one point further along said feedback circuit from said first point, a substantial impedance portion of at least one of said shunt impedance means being connected between said further point in said feedback circuit and at least one of said series impedance means, said control circuit including means for varying the relation between said first alternating voltage version and said second alternating voltage version.

2. A phase-shift oscillator comprising a first amplifier tube having an input circuit and an output circuit, a phase-shift network comprising a plurality of phase-shift meshes connected in tandem between said output circuit and said input circuit, a second amplifier tube having its input circuit coupled to said first amplifier tube output circuit and its output circuit coupled to at least one of said phase-shift meshes to deliver a control voltage thereto, said second amplifier tube including plate load means forming a part of at least one of said phase-shift meshes between ground for oscillator voltages and a point in said one of said phase-shift meshes near ground for oscillator voltages across said one mesh, a substantial impedance portion of said one mesh being between said point and an input terminal of said one mesh furthest from ground, and means for varying the amplification factor of said second amplifier.

3. A variable frequency phase-shift oscillator, comprising an amplifier having input and output terminals and a regenerative feedback circuit coupled therebetween, said feedback circuit including a plurality of frequency sensitive phase-shift sections therein, and a frequency control circuit coupled to said feedback circuit, said frequency control circuit comprising means for receiving a first oscillator voltage version at one point in said feedback circuit, and supplying an alternating control voltage version at oscillator frequency to at least one other point in said feedback circuit, said frequency control circuit including output load means forming a part of at least one of said phase-shift sections between ground for oscillator voltages and said other point in said feedback circuit, said other point being near ground for oscillator voltages applied across said one of said phase-shift sections so that a substantial impedance portion of said one section is between said other point and the input terminal of said one phase-shift section furthest from ground.

4. A variable frequency phase-shift oscillator as defined in claim 3, wherein said control circuit comprises an electron discharge device having an anode, cathode, and a control grid, the anode of said discharge device being coupled to said output load means, and means coupling the control grid of said discharge device to the input side of said phase-shift means.

5. A variable frequency phase-shift oscillator as defined in claim 4, wherein said coupling means for the control grid of said discharge device includes reactive voltage divider means for introducing phase shift and attenuation so that the grid to ground oscillator voltage supplied to said discharge device is out of phase with and only a small fraction of the oscillator voltage applied to said coupling means.

6. A phase-shift oscillator, comprising an amplifier having input and output terminals and a regenerative feedback circuit coupled therebetween, said feedback circuit including a frequency sensitive phase-shift network having input and output coupling terminals with the meshes of said phase-shift network being connected in tandem therebetween, said input and output coupling terminals of said network being connected between said output and said input terminals of said amplifier, respectively, said phase-shift network comprising a plurality of phase-shifting impedance meshes including series and shunt impedance branches with each of said meshes comprising a resistive impedance branch and a reactive impedance branch, the total phase shift produced between said input and output terminals of said network being a predetermined amount at a predetermined oscillator frequency, and frequency control means including a variable-mu discharge device having its grid coupled to the input of said phase-shift network and its plate coupled to a different point in said network for inserting a variable control voltage at oscillator frequency in series with a shunt impedance branch of at least one of said phase-shift meshes, the magnitude and phase of said voltage partially determining the total phase-shift produced through the phase-shift network and consequently said oscillator frequency, said frequency control means including output load means coupled to the anode of said discharge device and forming a part of the shunt impedance branch of said one of said phase-shift meshes, said load means having an impedance value which is a small fraction of the dynamic plate resistance of said discharge device and a small fraction of the shunt impedance branch of which it is a part.

7. A phase-shift oscillator as defined in claim 6, wherein said output load means is coupled to an impedance branch of said phase-shift network which is electrically closer to the input coupling terminals of said network than the output coupling terminals thereof.

8. A variable frequency phase-shift oscillator, comprising an amplifier having a regenerative feedback circuit, said feedback circuit including a frequency sensitive phase-shift network, said network comprising a plurality of phase-shift meshes connected in tandem between the output and input circuits of said amplifier, each of said meshes comprising a resistive and reactive impedance branch, an electron discharge device having a control grid therein, load means coupled to the anode or plate of said discharge device, the impedance of said load means being a small fraction of the dynamic plate resistance of said discharge device, a branch of at least one of said phase-shift meshes being coupled to said load means whereby the portion of said load means between its point of coupling to said branch and ground for oscillator voltages comprises a small fractional part of the total impedance of said branch, and means coupling the control grid of said discharge device to a source of voltage at oscillator frequency to produce a variable oscillating control voltage across said load means, the magnitude and phase of said control voltage partially determining the phase shift produced by said phase-shift network and consequently the frequency of oscillations produced by said oscillator, the magnitude of said control voltage being variable in accordance with variations in bias on the grid of said discharge device.

9. A variable frequency phase-shift oscillator as defined in claim 8, wherein at least one branch of each of a plurality of said phase-shift meshes is coupled to said anode load means.

10. A variable frequency phase-shift oscillator as defined in claim 9, wherein each of said branches is coupled to a different impedance point on said anode load means.

11. A variable frequency phase-shift oscillator as defined in claim 10, wherein said control grid of said discharge device is coupled to a source of voltage at oscillator frequency at the input to said phase-shift network.

12. A variable frequency phase-shift oscillator, comprising an amplifier having input and output circuits and a regenerative feedback circuit coupled therebetween, said feedback circuit including a cathode follower tube and a frequency sensitive phase-shift network, said phase-shift network comprising a plurality of phase-shift meshes coupled between the cathode impedance of said cathode follower tube and the input circuit of said amplifier, each of said phase-shift meshes comprising a plurality of impedance branches, the grid of said cathode follower tube being coupled to the output circuit of said amplifier, a variable-mu electron discharge device having a control grid therein, load means coupled to the anode or plate of said discharge device, the impedance of said load means being a small fraction of the dynamic plate resistance of said discharge device, means coupling an impedance branch of at least one of said phase-shift meshes to said anode load means whereby the portion of said load means between its point of coupling to said branch and ground for oscillator voltages comprises a small fractional part of the total impedance of said branch, and means coupling the control grid of said discharge device across at least a portion of the cathode impedance of said cathode follower to produce a variable alternating control voltage at the anode of said discharge device, the magnitude and phase of said control voltage partially determining the phase shift produced by said phase-shift network and consequently the frequency of oscillations produced by said oscillator, said alternating control voltage being variable in magnitude in accordance with the bias on the grid of said discharge device.

13. A variable frequency phase-shift oscillator as defined in claim 12, wherein said means coupling the control grid of said discharge device to said cathode impedance includes a phase-shifting and attenuating network for changing the phase and substantially reducing the magnitude of the oscillator voltage applied to the grid of said discharge device.

14. A variable frequency phase shift oscillator, comprising an amplifier having input and output circuits and a regenerative feedback circuit coupled therebetween, said feedback circuit including multi-section frequency sensitive phase-shift means therein, each section comprising a series capacitor and a shunt resistor, a frequency control circuit including an electron discharge device having an input coupled to said amplifier output circuit for receiving an input voltage therefrom and providing a variable control voltage output which is a version of said input voltage, and plate load resistor means having a terminal coupled to the anode of said discharge device and to a terminal of one of said shunt resistors, said plate resistor means having a very low value of resistance compared to the dynamic plate resistance of said discharge device and comprising means for inserting said variable control voltage in series with said one of said shunt resistors.

References Cited in the file of this patent

UNITED STATES PATENTS

| | | |
|---|---|---|
| 2,321,269 | Artzt | June 8, 1943 |
| 2,451,858 | Mork | Oct. 19, 1948 |
| 2,498,759 | Korman | Feb. 28, 1950 |
| 2,638,550 | Hester | May 12, 1953 |